United States Patent [19]

Holubec

[11] 4,162,985

[45] Jul. 31, 1979

[54] MULTIGRADE LUBRICANTS CONTAINING INTERPOLYMERS

[75] Inventor: Zenowie M. Holubec, Parma Heights, Ohio

[73] Assignee: The Lubrizol Corporation, Wickliffe, Ohio

[21] Appl. No.: 839,957

[22] Filed: Oct. 6, 1977

Related U.S. Application Data

[63] Continuation-in-part of Ser. No. 402,230, Oct. 1, 1973, abandoned.

[51] Int. Cl.$^2$ .................... C10M 1/48; C10M 3/42; C10M 1/16; C10M 3/10
[52] U.S. Cl. ............................. 252/32.7 E; 252/45; 585/11
[58] Field of Search .............. 252/59, 32.7 E, 45; 208/19

[56] References Cited

U.S. PATENT DOCUMENTS

| | | | |
|---|---|---|---|
| 2,073,506 | 3/1937 | Voorhees | 87/9 |
| 2,084,501 | 10/1937 | Otto et al. | 196/151 |
| 2,099,513 | 11/1937 | De Gimo et al. | 196/13 |
| 2,227,690 | 1/1941 | Arveson | 252/59 |
| 2,327,705 | 8/1943 | Frolich et al. | 252/59 |
| 2,534,095 | 12/1950 | Young | 252/59 |
| 3,077,452 | 2/1963 | Fainman | 252/59 |
| 3,236,771 | 2/1966 | Matson | 252/32.7 E |
| 3,329,613 | 7/1967 | Fischer et al. | 252/59 |
| 3,389,087 | 6/1968 | Kresge et al. | 252/59 |
| 3,554,911 | 1/1971 | Schiff et al. | 252/59 |
| 3,630,905 | 12/1971 | Gorgo | 252/59 |
| 3,634,249 | 1/1972 | Dupas et al. | 252/59 |
| 3,637,503 | 1/1972 | Giannetti et al. | 252/59 |
| 3,752,767 | 8/1973 | Eckert et al. | 252/59 |
| 3,825,495 | 7/1974 | Newingham et al. | 252/32.7 E |
| 3,878,115 | 4/1975 | Gouillard et al. | 252/59 |
| 4,036,771 | 7/1977 | Denis et al. | 252/56 R |
| 4,082,680 | 4/1978 | Mitacek | 252/59 |

FOREIGN PATENT DOCUMENTS

| | | | |
|---|---|---|---|
| 1416817 | 9/1965 | France | 252/59 |
| 2113901 | 6/1972 | France | 252/59 |
| 1033456 | 6/1966 | United Kingdom | 252/59 |
| 1329000 | 9/1973 | United Kingdom | 252/59 |
| 28910 | 6/1974 | United Kingdom | 252/59 |
| 1355341 | 6/1974 | United Kingdom | 252/59 |
| 1419853 | 12/1975 | United Kingdom | 252/59 |
| 1458573 | 12/1976 | United Kingdom | 252/59 |

*Primary Examiner*—Irving Vaughn
*Attorney, Agent, or Firm*—James W. Adams, Jr.; Daniel N. Hall

[57] ABSTRACT

Oil compositions useful as lubricants and multigraded between SAE 75W and SAE 250 can be made by combining (A) about 95 to about 30 weight percent of a base oil consisting of an oil having a viscosity of about 40 to 2000 SUS at 100° F., (B) an extreme pressure improving amount of at least one extreme pressure agent, and (C) about 5 to about 70 weight percent of at least one oil-soluble polymer, said polymer being exemplified by a hydrogenated interpolymer of a monovinyl arene and at least one $C_{4-6}$ conjugated diene or at least one $C_{2-6}$ alpha-olefin.

23 Claims, No Drawings

MULTIGRADE LUBRICANTS CONTAINING INTERPOLYMERS

REFERENCE TO RELATED APPLICATIONS

This application is a continuation-in-part of U.S. Ser. No. 402,230, filed Oct. 1, 1973 now abandoned.

FIELD OF THE INVENTION

This invention concerns lubricating oil compositions which are especially adapted for use in mechanical systems where gears are subjected to great stresses and extremely high pressures such as those found in automotive rear axles and tractor transmissions. In particular, the invention concerns a gear lubricant comprising in combination a base oil, at least one polymer of specified structure and molecular weight, and at least one extreme pressure or load-carrying agent.

BACKGROUND OF THE INVENTION

The problems associated with the lubrication of automotive rear axle and transmission gears are well known to those of skill in the art. Such gears are usually hypoid in nature and for reasons inherent in their design develop great pressures between the contacting metal surfaces of the gear. These pressures literally squeeze out ordinary mineral oil lubricants from between the gears and result in metal-to-metal contact between the parts of the gear under extremely high pressures. Such metal-to-metal contact soon leads to deformation and destruction of the gear surfaces.

To alleviate these and other problems it has become a common practice to add to gear oils certain chemical substances which are generally called additives. Among such additives are extreme pressure agents which are widely believed to react with the metal surfaces of the gear under the elevated temperatures and high pressures generally encountered during operation of the gear to form thin films. These newly formed layers act as separants and lubricants for the gear surfaces and thus prevent or reduce destructive metal-to-metal contact.

Recently a demand has arisen for lubricants which will function satisfactorily as gear lubricants under a wide range of temperature conditions. Such compositions are characterized by relatively small changes in their viscosities with changing temperature and they are commonly graded according to SAE standards according to their viscosities at low (e.g., 0° F.) and high temperatures (e.g., 210° F.) as is explained in further detail below. Because of this grading, such gear oils are often said to be "multigraded." In terms of widely accepted concepts such multigraded gear lubricants can also be said to have high viscosity indices. Multigraded gear lubricants thus have the desirable property of being able to function immediately, though cold, upon being put into service and continue to function satisfactorily as they become heated during operation.

In addition to being multigraded, it is desirable that lubricant compositions especially adapted for use as gear lubricants, exhibit shear stability. This means that they will not degrade or lose their viscosity as a result of the shearing forces encountered during their use. Compositions exhibiting desirable shear stability will be found to generally have a viscosity within 85 to 95% of their original viscosity after many hours (say 1000) of service. It has been recognized that many ordinary viscosity index improvers commonly added to crankcase lubricating oils, such as high molecular weight polyisobutylenes and polyacrylates, do not possess the desired shear stability for use in improving the viscosity properties of gear lubricants.

It has now been found that, in accordance with this invention, multigrade lubricants exhibiting exceptional shear stabilities can be made by combining in certain proportions base oils, polymers of specified structure and molecular weight and extreme pressure agents.

SUMMARY OF THE INVENTION

The lubricating oil compositions of this invention comprise (A) about 95 to about 30, preferably about 90 to about 50 weight percent of a base oil, (B) at least one extreme pressure agent in an amount sufficient to impart extreme pressure properties thereto, and (C) at least one oil-soluble interpolymer, said interpolymer being a hydrogenated interpolymer of at least one monovinyl arene and at least one $C_{4-6}$ conjugated diene or at least one $C_{2-6}$ alpha-olefin. The interpolymer has a number average molecular weight of about 750 to about 10,000, and is present in the composition in an amount so as to allow the composition to be multigraded according to SAE standards in the multigrade range between SAE 75W and SAE 250.

DESCRIPTION OF SPECIFIC EMBODIMENTS

The base oils of the present invention, that is, component (A), have viscosities of about 40 to about 2000 SUS at 100° F. Preferably they have viscosities of about 75 to about 500 SUS at 100° F., and most preferably of about 100 to about 300 SUS at 100° F. These base oils may be selected from natural oils, synthetic oils, and combinations of two or more of these types of oils; e.g., combinations of different natural oils, combinations of different synthetic oils, or combinations of one or more natural oils with one or more synthetic oils. Selection of materials suitable as base oils is within the skill of the art using the parameters herein set forth.

When the base oil is a mixture of natural and synthetic oils, the mixture contains about 5 to about 95 weight percent of at least one synthetic oil. Preferably such mixtures contain 40 to about 90% natural oil and 60 to about 10% synthetic oil. Of course, both the natural oils and synthetic oils can themselves be mixtures of various types of natural oils or synthetic oils.

When the base oil consists of natural oils, they are often derived from petroleum, although oils derived from other natural sources such as shale, coal, animals and plants can also be used. Among the general types of petroleum oils useful in the compositions of this invention are solvent neutrals, bright stocks, cylinder stocks, residual oils, hydrocracked base stocks, paraffin oils including pale oils, and solvent extracted naphthenic oils. Such oils and blends of them are produced by a number of conventional techniques which are widely known by those of skill in the art. All that is required of oils useful in this invention is that they have viscosities falling within the above-noted ranges and be generally compatible with the other components of the gear lubricant and the materials used in construction of the gear assemblies in which they function.

As is noted above, the base oil can consist essentially of or comprise a portion of one or more synthetic oils. Among the suitable synthetic oils are homo- and interpolymers of $C_{2-12}$ olefins, carboxylic acid esters of both monoalcohols and polyols, polyethers, silicones, poly-glycols, silicates, alkylated aromatics, carbonates, thiocarbonates, orthoformates, phosphates and phosphites, borates and halogenated hydrocarbons. Representative of such oils are homo- and interpolymers of $C_{2-12}$ monohydrocarbyl olefins, alkylated benzenes (e.g., dodecyl benzenes, didodecyl benzenes, tetradecyl benzenes, dinonyl benzenes, di-(2-ethylhexyl) benzenes, wax alkylated naphthalenes, etc.); polyphenyls (e.g., biphenyls, terphenyls, etc.); and the like.

Alkylene oxide polymers and interpolymers and derivatives thereof where the terminal hydroxyl groups have been modified by esterification, etherification, etc., constitute another class of useful synthetic oils. These are exemplified by the oils prepared through polymerization of alkylene oxides such as ethylene oxide or propylene oxide, the alkyl and aryl ethers of these polyoxyalkylene polymers (e.g., methylpolyisopropylene glycol ether having an average molecular weight of 1000, diphenyl ether of polyethylene glycol having a molecular weight of 500–1000, diethyl ether of polypropylene glycol having a molecular weight of 1000–1500, etc.) or mono- and polycarboxylic esters thereof, for example, the acetic acid esters, mixed $C_3$–$C_8$ fatty acid esters, or the $C_{13}$ Oxo acid diester of tetraethylene glycol. Among such glycols are the polyalkylene glycols sold by the Union Carbide Corp. of New York under trade names and marks of UCON LB-135, UCON LB-385, and UCON LB-1145.

Another suitable class of synthetic oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, ethylene glycol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like. Among the halogenated hydrocarbons useful as base oils are chlorinated phenyl and biphenyls, low molecular weight chlorotrifluoroethylene polymers, polytetrafluoroethylenes of appropriate molecular weights and the like.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl)silicate, tetra-(4-methyl-2-tetraethyl)silicate, tetra-(p-tert-butylphenyl)silicate, hexyl-(4-methyl-2-pentoxy)-disiloxane, poly-(methyl)-siloxanes, poly(methylphenyl)-siloxanes, etc.). Among these are the oils sold by the Dow Corning Co. of Michigan, under the trade names and marks of DC-200, DC-500 and DC-700. Other synthetic lubricating oils include liquid esters of phosphorus-containing acids (e.g., tricresyl phosphate, trioctyl phosphate, triphenyl phosphite, diethyl ester of decane phosphonic acid, etc.).

Organic carbonates and thiocarbonates such as those formed from the well known Oxo alcohols as well as orthoformates, mercaptals, thiol or thioformates and the like can also be used as synthetic oils in this invention, if in the form they are used (e.g., as blends) they exhibit viscosities within the aforesaid limits.

The fact that the base oils of this invention may consist of natural, synthetic, or natural-synthetic blended oils does not mean that these three types of oils are necessarily equivalents of each other. Certain types of base oils may be used in certain inventive compositions for the specific properties they possess such as nonflammability or lack of corrosivity towards specific metals (e.g., silver or cadmium) which are used in certain specialized gear assemblies. In other compositions, other types of base oils may be preferred for reasons of availability or low cost. Thus, the skilled artisan will recognize that while the three types of base oils discussed above are all useful in the compositions of the present invention, they are not necessarily functional equivalents of each other in every instance.

As is clear from the above discussion, in certain embodiments of this invention, the synthetic oil is not solely hydrocarbyl in nature, but can contain atoms of oxygen, sulfur, silicon, halogen, etc., as well as those of carbon and hydrogen; of course, in other embodiments the synthetic oil will be solely hydrocarbyl in nature. This is also true of the natural oils used in this invention.

It is preferable that, if the lubricants of the present invention consist essentially of only one synthetic base oil and only one polymer, i.e., component (C), the base oil should not be derived from the same olefin as the polymer. Thus, if the base oil is a synthetic styrene-butadiene polymer, it is preferable that the polymer (C) not be a butadiene-styrene polymer.

In many embodiments it is preferable that the synthetic oil have a number average molecular weight below about 800. Naturally, such oils must also conform to the viscosity limitations set forth above.

Another component of the lubricating oils of this invention, that is, component (C), is at least one oil-soluble interpolymer derived from one or more monovinyl arenes and at least one $C_{4-6}$ conjugated diene and/or at least one $C_{2-6}$ alpha-olefin. The characterization of these polymers as oil-soluble does not necessarily mean they are soluble in all base oils in all proportions; it means they are soluble in the base oils with which they are formulated to a degree sufficient to allow the lubricant composition to be multigraded between SAE 75W and SAE 250. These polymers have number average molecular weights within the range of about 750 to about 5,000; preferably their molecular weights lie between about 900 and about 3,000. As used herein, the term "interpolymer" is intended to be generic to copolymers, terpolymers, and the like.

The monovinyl arene monomers from which the interpolymers (C) are derived can comprise vinyl-substituted, mono-, di-, or polynuclear aromatic compounds such as styrene, alpha-methyl styrene, a vinyl pyridine, vinyl naphthylene, vinyl phenanthrene, etc. Preferably, however, they are monovinyl mononuclear aromatic compounds such as styrene, mono- or polyalkylated styrenes and substituted styrenes including substituted alkylated styrenes. The alkyl groups in the alkylated styrenes can be attached to the alpha carbon of the styrene (as, for instance, in alpha-methyl styrene) and/or to the aromatic ring (as, for instance, in o-, m-, or p-methyl styrene, paratertiary butyl styrene, etc.) and normally will contain no more than about thirty carbon atoms; preferably such alkyl groups, if present, will be lower alkyl groups of less than ten carbon atoms.

Styrene and para-tertiary butyl styrene are preferred as monomers for formation of the interpolymer (C).

Mixtures of various vinyl aromatic monomers can also be used to produce these interpolymers. Substituted monovinyl arene compounds can also be used, wherein the arene portion of the molecule is substituted with, for instance, an ether group (especially hydrocarbyloxy and particularly alkoxy groups of about up to ten carbon atoms), amino groups (particularly disubstituted amino groups such as dialkyl or diaryl amino and the like, e.g., dimethyl amino, diheptyl amino, dicyclohexyl amino, etc.), nitro groups, cyano groups, thioether groups (especially $C_{1-10}$ alkyl thioethers), and halo groups such as fluorine, chlorine, bromine, etc.

Examples of the $C_4$–$C_6$ conjugated dienes which are useful in producing the interpolymers of the present invention are piperylene, 2,3-dimethyl butadiene, chloroprene, isoprene and butadiene, the last two being particularly preferred. Mixtures of such conjugated dienes, e.g., butadiene and isoprene, can also be used.

The $C_2$–$C_6$ alpha-olefins which are useful in producing the interpolymers (C) can be normal or branch-chain alpha-olefins such as ethylene, propylene, n-butene-1, isoprene, 2-methyl pentene-1, isobutylene, 3-ethyl pentene-1, n-hexene, etc.

The ratio of monovinyl arene and conjugated diene or alpha-olefin monomers used to produce the interpolymers of the present invention can vary between wide limits. But as it is noted above, after hydrogenation, the interpolymer is soluble in the base oil into which it is incorporated. This fact limits the amount of monovinyl arene monomer which can be incorporated into the interpolymer, since the solubility of the hydrogenated interpolymer can often depend on its particular structure. In the case where the monovinyl arene monomer is styrene it is usually found that no more than about seventy mole percent of styrene can be incorporated into the interpolymer while when the monovinyl arene compound is a substituted styrene (e.g., p-tertiary butyl styrene) often amounts in up to 99 mole percent of the monovinyl arene compound can be incorporated. Thus, interpolymers with ratios of the number of units originating from the monovinyl arene compound to the number of units originating from a conjugated diene or the alpha-olefin can vary between from about 1 to about 99 and about 90 to 10, preferably between about 5 to about 95 and about 85 to about 15, and more preferably between about 30 to about 70 and about 75 to about 25. If desired, the interpolymers (C) can also contain a relatively small amount of units derived from other monomers. Examples of such other monomers which can be mentioned are vinyl pyridines, alkyl esters of acrylic and methacrylic acid (e.g., methyl methacrylate, dodecyl methacrylate, octadecyl methacrylate, etc.), vinyl chloride, vinylidene chloride, vinyl fluoride, vinylidene fluoride, vinyl esters of carboxylic acids (e.g., vinyl acetate and vinyl stearate, etc.).

The hydrogenated interpolymers (C) can be either random or block in nature and many techniques for making both types of interpolymers are well known to those of skill in the art. See, for example, with relation to random interpolymers, U.S. Pat. No. 3,752,767, U.S. Pat. No. 2,975,160, U.S. Pat. No. 3,094,512 and U.S. Pat. No. 3,554,911. With reference to block polymers, see U.S. Pat. No. 3,333,024, U.S. Pat. No. 3,431,323, U.S. Pat. No. 3,465,063 and U.S. Pat. No. 3,668,125, as well as German Published application No. 2,132,336 which corresponds in part to the afore-mentioned U.S. Pat. No. 3,752,767. Each of these patents is hereby incorporated by reference for its relevant disclosures.

Briefly, such polymers are usually prepared by anionic polymerization using, for example, an alkali metal hydrocarbon (e.g., butyl lithium) as a polymerization catalyst. Other polymerization techniques such as emulsion polymerization can also be used.

The interpolymers (C) are hydrogenated before use in this invention so as to remove a substantial portion of their unsaturation, either that derived from the olefinic groups or from the arene unsaturation, to produce oil-soluble interpolymers which are useful in the present invention. Techniques for accomplishing this hydrogenation are well known to those of skill in the art and need not be described in detail at this point. Briefly, hydrogenation is accomplished by contacting the interpolymers with hydrogen at super-atmospheric pressures in the presence of a metal catalyst such as Raney nickel, palladium supported on charcoal, etc. Further details of such hydrogenations as well as examples can be found in the patents mentioned above in relation to the random or block nature of these interpolymers.

In general, it is preferred that the interpolymers (C), for reasons of oxidative stability, contain no more than five percent residual olefinic unsaturation on the basis of the total number of carbon-to-carbon covalent linkages within the average molecule. Such unsaturation can be measured by a number of means well-known to those of skill in the art, such as infrared, NMR, etc. Most preferably, these interpolymers contain no discernible unsaturation, as determined by the afore-mentioned analytical techniques.

Specific examples of the interpolymers (C) are the following:

1. Block copolymer completely hydrogenated (polystyrene-polyisoprene-polystyrene)(35/30/35)w. Number average molecular weight (M.W.) 1000-2000-1000.

2. Block copolymer completely hydrogenated polystyrene-hydrogenated polyisoprene-completely hydrogenated polystyrene(1/1/1)m. M.W. 800-1500-800.

3. Block copolymer polyvinylcyclohexane-hydrogenated polybutadiene-polyvinylcyclohexane(1/1/1)m. M.W. 500-2000-500.

4. Block copolymer polyvinylcyclohexane-ethylene/propylene random copolymer-polyvinylcyclohexane (1/1/1)m. M.W. 750-1500-750.

5. Block copolymer polyvinylcyclohexane-hydrogenated polyethylene-polyvinylcyclohexane(1/1/1)m. M.W. 600-1000-600.

6. Block copolymer polyvinylcyclohexane-hydrogenated polypropylene-polyvinylcyclohexane(1/1/1)m. M.W. 750-1200-750.

7. Block copolymer polyvinylcyclohexane-hydrogenated ethylene/propylene random copolymer-polyvinylcyclohexane(1/1/1)m. M.W. 700-1100-700.

8. Hydrogenated random butadiene/styrene (35/65)w. M.W. 3000.

9. Hydrogenated random butadiene/styrene (41/59)w. M.W. 4500.

10. Hydrogenated random p-tert-butyl styrene/butadiene(1/1.33)m. M.W. 2500.

11. Hydrogenated random copolymer styrene/isoprene(1/1)m. M.W. 2500.

12. Hydrogenated random copolymer vinyl toluene/butadiene(1/1.33)m. M.W. 3000.

13. Hydrogenated random terpolymer styrene/p-tert-butyl styrene/butadiene(0.5/0.5/1.33)m. M.W. 3500.

14. Block copolymer completely hydrogenated [polystyrene-[styrene/butadiene(1/1)m random copolymer-polystryene](1/1/1)m]. M.W. 800-1500-800.

15. Block copolymer hydrogenated polyisoprene-completely hydrogenated polystyrene-hydrogenated polyisoprene(1/1/1)m. M.W. 1500-800-1500.

The third component, i.e., component (B), of the lubricant compositions of this invention, is an oil-soluble extreme pressure agent, or a combination of two or more such agents. Substances which function as extreme pressure agents in lubricating oils are of an extremely diverse nature as is well known to those of skill in the art. See, for example, the particularly useful discussions in the books "Lubricant Additives" by C. V. Smalheer and R. Kennedy Smith (Lezius-Hiles Co. Publishers, Cleveland, Ohio, 1967), pages 9 et seq.; "Gear and Transmission Lubricants", by C. T. Boner (Reinhold Publishing Corp., New York, 1964), pages 85–100; and "Lubricant Additives" by M. W. Raney (Noyes Data Corporation, New Jersey, 1973), pages 146–221. These publications are expressly incorporated herein by reference for their discussion of how to make and/or use extreme pressure agents as well as for their discussion of the state of the art with regard to extreme pressure agents.

Among the types of compounds known by those skilled in the art to be useful as extreme pressure agents in the lubricating compositions and, therefore, useful as component (B) of this invention, are organo-boron, organo-sulfur, organo-halogen, organo-halosulfur, organo-phosphorus, organo-halophosphorus, and organo-thiophosphorus compounds as well as esters, amides, and salts of phosphorus and carboxylic acids and oil-soluble molybdenum-containing complexes such as those disclosed in U.S. Pat. No. 3,541,014. This patent is hereby incorporated by reference for its discussion of such complexes. Each of these types of compounds can be exemplified by the following:

(1) Borate esters of $C_{1-8}$ alkanols and adducts prepared by reaction of succinimides of polyalkylene amines and boric acid. Specific examples include trioctyl borate and the adduct formed by reaction of boric acid with a polyisobutenyl succinimide of tetraethylene pentamine.

(2) Sulfurized olefins, sulfurized fatty acid esters of both natural (e.g., sperm oil) and synthetic origins, trithiones, thienyl derivatives, sulfurized terpenes, sulfurized oligomers of $C_{2-8}$ monoolefins, xanthates of alkanols and other organo-hydroxy compounds such as phenols, thiocarbamates made from alkyl amines and other organo amines, etc.; sulfurized Diels-Alder adducts such as those disclosed in U.S. Pat. No. RE 27,331. Specific examples include sulfurized polyisobutene of $\overline{M}n$ 1100, sulfurized triisobutene, dicyclohexyl disulfide, diphenyl and dibenzyl disulfide, etc.

(3) Chlorinated waxes of both the paraffinic and microcrystalline type, polyhaloaromatics such as di- and trichlorobenzene, trifluoromethyl naphthalenes, perchlorobenzene, pentachlorophenol, dichloro diphenyl trichloroethane, etc.

(4) Chlorosulfurized olefins and olefinic waxes, sulfurized chlorophenyl methyl chlorides, chloroxanthates, etc.; specific examples include chlorodibenzyl disulfide, chlorosulfurized polyisobutene of $\overline{M}n$ 600, chlorosulfurized pinene and lard oil, etc.

(5) Trialkyl and triaryl phosphites, phosphonates and phosphates, dihydrocarbyl phosphites, etc; such as tricresyl phosphate, tributyl phosphite, tris(2-chloroethyl)phosphate and phosphite, dibutyl trichloromethyl phosphonates, di(n-butyl)phosphite, toly phosphinic acid dipropyl ester, etc.

(6) Metal dithio dihydrocarbyl phosphates, particularly those of lead and zinc, phosphorus pentasulfideolefin reaction products, esters of dithiophosphorus acids, esters and salts of thio and dithiophosphates, etc. Specific examples include lead, zinc and sodium dioctyl dithiophosphates, lead and zinc dibenzyl dithiophosphates, etc.

(7) Reaction products of olefin oxides (e.g., ethylene and propylene oxide) and phosphorus halides oxyhalides or thiohalides, reaction products of phosphites and chloralor bromal, chloro- and bromo-alkyl phosphites and phosphates and amine salts thereof, etc.

(8) Phosphate salts of amines, ammonia and metals, analogous phosphonic acid derivatives, neutral phosphites, phosphonites, phosphates and phosphonates and their thioanalogs, etc. Specific examples include the dihexyl ammonium salt of trichloromethane phosphonic acid, the diethyl hexyl ammonium salt of dioctyl dithiophosphate, etc.

(9) Fatty acids, dimerized and trimerized unsaturated natural acids (e.g., linoleic) and esters, amine, ammonia, and metal (particularly lead) salts thereof, and amides and imidazoline salt and condensation products thereof, oxazolines, and esters of fatty acids, such as ammonium di(linoleic) acid, lard oil, oleic acid, animal glycerides, lead stearate, etc.

Many of these extreme pressure agents and further specific examples are described in detail in the aforementioned books, "Lubricant Additives" and "Gear and Transmission Lubricants".

Particular classes of extreme pressure agents useful in this invention are the sulfurized hydrocarbons and organo-thiophosphonyl salts, and mixtures of such compounds. The preparation of such compounds is well known in the art. See, for example, the disclosures of U.S. Pat. No. 3,231,558 and U.S. Pat. No. 3,197,405, and the above-noted books which are hereby incorporated by reference. In brief, the organo-sulfur compounds are made by reacting an organic material such as isobutylene with a halosulfurizing agent such as sulfur monochloride and subsequently treating the intermediate formed with a sulfurizing agent such as sodium sulfide or polysulfide to produce the desired organo-sulfur extreme pressure agent. The organo-thiophosphorus compounds are conveniently made by reacting a phosphorus sulfide (e.g., $P_4S_{10}$) with a mercaptan or alcohol.

At least one of the afore-described extreme pressure agents is present in the compositions of this invention in an amount sufficient to improve the extreme pressure properties of the composition. In general, this amount will be about 0.25 to about 20 weight percent of the total composition. More preferably, it ranges from about 0.5 to about 10 weight percent of the total composition.

Often it is desirable to use combinations of two or more of the above-described extreme pressure agents. Such combinations can include mixtures of two or more compounds selected from a single class, or compounds selected from two or more classes of extreme pressure agents. Whatever the particular combination is, however, the total amount of extreme pressure agent will fall within the above-recited ranges.

Lubricating oils for gears can be classified according to a scheme introduced by the American Society of Automotive Engineers (SAE). According to this socalled SAE classification such lubricating oils are classified into two groups on the basis of their minimum viscosities at 210° F., (98° C.). These groups are the winter grades and the normal grades. Each of the two groups is divided into a number of classes. The classes of the winter grades are indicated with the letter W preceded by a number, e.g., a 75W, 80W or 85W oil. The winter grades have a specified minimum viscosity at 210° F. The classes of the normal grades are indicated by a number only, viz. a 90, 140 or 250 oil. The normal grades must have a viscosity at 210° F. within a specified range. Generally, oils complying to a certain winter grade do not comply with the viscosity requirement for any normal grade as well, and, conversely, oils complying to a certain normal grade do not comply with the viscosity requirement for a winter grade. Lubricating oils that fall within one SAE class only (viz. either comply with a normal or a winter grade) are designated as single-grade lubricating oils. Examples of widely used single-grade lubricating oils are SAE 75W and SAE 90 oils. On the other hand, lubricating oils which do in fact comply with the specification of both a winter grade and a normal grade are designated as multigrade lubricating oils.

It is a particular feature of the compositions of this invention that they may be multigraded according to SAE standards within the multigrade range lying between SAE 75W and SAE 250. This means that the compositions have viscosities which allow them to be characterized as multigrade; that is, they may be, for example, SAE 75W/85W, SAE 90/250, SAE 85W/140 and so forth. The viscosity properties required to be exhibited by compositions meeting such standards are summarized in the following table:

TABLE I

| | SAE 75W | SAE 80W | SAE 85W | SAE 90 | SAE 140 | SAE 250 |
|---|---|---|---|---|---|---|
| Vis. @ 210° F. (99° C.) (a) | | | | | | |
| Min. (cSt) (b) | 4.2 | 7.0 | 11.0 | 14.0 | 25.0 | 43.0 |
| Max. (cSt) | no req. | no req. | no req. | 25.0 | 43.0 | no req. |
| Min. (SUS) (c) | 40.0 | 49.0 | 63.0 | 74.0 | 120.0 | 200.0 |
| Max. (SUS) | no req. | no req. | no req. | 120.0 | 200.0 | no req. |

(a) Viscosities determined by ASTM D-445 procedure as set forth by the American Society for Testing and Materials, 1916 Race Street, Philadelphia, Pa. 19103, U.S.A.
(b) Centistokes
(c) Saybolt Universal Seconds
Grades 75W, 80W and 85W are further defined as having the following maximum temperatures for viscosity of 150,000, cp: −40° C., −26° C., and −12° C., respectively.

Thus the lower SAE value is the minimum viscosity the oil can have (and still meet the standard), while the upper value is the maximum viscosity the oil can have. For example, an oil multigraded as SAE 75W/90 has (as the data in Table I shows) a minimum viscosity of 4.2 cSt (or 40 SUS) at 210° F. and a maximum viscosity of 25 cSt (or 120 SUS) at 210° F., while an oil multigraded as SAE 90/140 has a minimum viscosity of 14.0 cSt (or 74.0 SUS) and a maximum viscosity of 43.0 cSt (or 200 SUS), both measured at 210° F.

It is these viscosity properties which make the compositions of this invention especially useful since they can function satisfactorily over a wide range of temperatures. Thus, the compositions can function to lubricate a gear at extremely cold temperatures during start-up or while flying at high altitude and still maintain satisfactory lubricating properties well after operation of the gear has resulted in a substantial increase in temperature or the gear-containing device has returned to a warm environment.

Many of the preferred embodiments of this invention are also characterized by properties which permit them to conform with the requirements of MIL-L-2105B specifications promulgated by the U.S. Government for gear lubricants. They thus possess adequate properties with respect to foaming, thermal and oxidative stability, water separation, compatability and copper corrosion.

In addition to the three essential components discussed above, the compositions of this invention can also include other conventional lubricant additives which confer a variety of beneficial properties upon the composition. Such additives as antiwear agents and additives to improve the load-carrying properties of lubricants such as trihydrocarbyl phosphates or metal, particularly zinc hydrocarbyl dithiophosphates; antioxidants such as hindered alkyl phenols (e.g., 2,6-Di-t-butyl-4-methyl phenol); rust inhibitors such as alkylated succinic acids and anhydrides or calcium, barium or sodium sulfonates; ashless detergent/dispersants such as those noted below; ash-forming detergent/dispersants such as metal phenates and sulfonates; anti-foaming agents, such as silicones, anti-friction agents, such as stearyl alcohol or stearyl cyanide; dyes, metal deactivators and so forth may be included in appropriate amounts, in the composition of this invention.

Among the ashless detergent/dispersants which can be used to advantage in the oil compositions of this invention are those which are formed by reaction of a mono-alcohol or polyol with a high molecular weight mono- or polycarboxylic acid acylating agent containing at least thirty carbon atoms in the acyl moiety. Such ester compositions are well known to those of skill in the art. See, for example, French Pat. No. 1,396,645, British Pat. Nos. 981,850; 1,055,337; and No. 1,306,529 as well as U.S. Pat. Nos. 3,255,108; 3,311,588; 3,311,776; 3,346,345; 3,381,022; 3,522,179; 3,542,680; 3,576,743; 3,579,450; 3,632,510; and 3,639,242. Each of the foregoing U.S. and foreign patent publications is expressly incorporated herein by reference for their descriptions of how to make and use such compositions.

Another type of particularly useful ashless dispersant is formed by the reaction of a mono- or poly-carboxylic acid acylating agent with polyamines. Other related useful dispersants can be prepared by post-treating such dispersants with alkoxides, cyanides, etc. See, for example, U.S. Pat. No. RE 26,433; U.S. Pat. Nos. 3,172,892; 3,216,936; 3,219,666; 3,256,185; 3,272,746; 3,278,550; 3,306,493; 3,341,542; 3,366,569; 3,373,111; 3,374,174; 3,502,677; 3,541,012. Other useful ashless dispersants are formed by the reaction of a halogenated polymer with a polyalkylene polyamine. Such dispersants are described in U.S. Pat. Nos. 3,573,010; 3,574,576; 3,438,757; 3,565,804; and 3,565,492. Still other ashless dispersants are formed by reaction of an alkylated phenol, a lower aldehyde and an amine or polyamine via the well-known Mannich reaction. Such materials are disclosed in U.S. Pat. Nos. 3,036,003; 3,368,972; 3,413,347; 3,448,047; 3,539,633; and 3,649,229. The above U.S. Patents are expressly incorporated herein by reference for their discussion of the preparation and use of such materials in lubricants.

A particularly useful type of additive often included in compositions of this invention is one or more pour point depressants. The use of such pour point depressants in oil-base compositions to improve the low temperature properties of the compositions is well known to the art. See, for example, the afore-mentioned book "Lubricant Additives" by Smalheer and Smith, page 8, and "Gear and Transmission Lubricants", p. 102, and "Lubricant Additives" by Ranney. Among the types of compounds which function satisfactorily as pour point depressants in the composition of the present invention are polymethacrylates, polyacrylates; condensation products of haloparaffin waxes and aromatic compounds, and vinyl carboxylate polymers. A particularly useful class of pour point depressants are terpolymers made by polymerizing a dialkyl fumarate, vinyl ester of a fatty acid and a vinyl alkyl ether. Techniques for preparing such polymers and their uses are disclosed in U.S. Pat. No. 3,250,715 which is hereby incorporated by reference for its relevant disclosures. Generally, when they are present, in the compositions of this invention, the pour point depressants are present in the amount of 0.01 to about 5 weight percent of the total composition.

It is believed that the nature of the invention may be more accurately appreciated from a study of the following examples which are given mainly for illustrative purposes and are in no way intended to limit the scope of the claimed invention.

EXAMPLE 1

A hydrogenated random butadiene-styrene copolymer having a number average molecular weight of about 2600 and a composition of four moles of butadiene-derived units to every three moles of styrene-derived units is prepared by the following procedure: An autoclave under nitrogen atmosphere is charged with 1200 parts of a mixture of cyclohexane and hexane (3:1), 70 parts of styrene, 58 parts of liquid butadiene and 15 parts of a solution of 60 parts of tetrahydrofuran in 1000 parts of cyclohexane. The reactor is heated to 50° C. and impurities still present in the mixture scavenged by the addition of small portions of a 0.1 molar solution of secondary butyllithium in cyclohexane until the temperature begins to rise. Then 45 parts of the same butyllithium solution is added as a polymerization catalyst. The reaction mixture was stirred at 50°-60° under nitrogen for five hours. Polymerization was terminated by the addition of 5 parts of a solution of 100 parts isopropyl alcohol in 1000 parts of cyclohexane.

The contents of the autoclave is then transferred under nitrogen to a second autoclave and the nitrogen atmosphere replaced with hydrogen. A mixture of ten parts of a 0.05 molar solution of nickel octenate in cyclohexane and 5 parts of a 0.2 molar solution of aluminum triethyl in cyclohexane is prepared separately and stirred for 0.25 hour at 40° C. This mixture is then added to the autoclave which was pressurized with hydrogen to 50 kg/cm$^2$, and the hydrogenation mixture heated to 40°-50° C. The extent of hydrogenation is followed by ozone titration of aliquots from the reaction mixture. At the end of the hydrogenation the hydrogen overpressure is released and the catalyst deactivated by the addition of a mixture of aqueous hydrochloric acid and methanol. The organic layer is washed with water until neutral, dried and the polymer recovered by evaporation of the organic solvent/diluent.

EXAMPLE 2

A hydrogenated random copolymer of p-tert-butyl styrene and butadiene having a molecular weight of about 3200 is prepared by the procedure used in Example 1 with the exceptions that the molar ratio of p-tert-butyl styrene to butadiene used is 1:1.3 and the amount of catalyst solution used is 35 parts.

EXAMPLE 3

A hydrogenated block copolymer of styrene and isoprene having polystyrene, polyisoprene, polystyrene individual blocks of molecular weights 800–1500–800, respectively, is prepared by the following procedure: An autoclave under nitrogen atmosphere is charged with 1000 parts of cyclohexane and 100 parts of styrene. The mixture is then scavenged of impurities by the procedure described in Example 1. The secondary butyllithium catalyst solution described in Example 1 is then added (180 parts) and the reactor heated to 45°-55° C. while being stirred. When conversion is complete at the end of two hours, 200 parts of isoprene is added to the reaction mixture which is then stirred at 50° for another three hours. Then another charge of 100 parts of styrene is added to the reactor and the reaction mixture is heated again for three hours at 50° C. The polymerization is terminated by the addition of the isopropyl alcohol-cyclohexane solution described in Example 1. The polymer is then hydrogenated using the same general procedure described in Example 1.

A number of lubricant compositions embodying the present invention are prepared by blending together the products of Examples 1–3 as outlined in Table II in the indicated proportions. The viscosity properties of these compositions are also summarized in Table II. It should be noted that where the percentage of components does not add up to 100 the balance of the composition consists of a pour point depressing terpolymer of a $C_{12}$–$C_{14}$ fumarate diester, ethyl vinyl ether and vinyl acetate. The extreme pressure agents used in preparing these blends are all commercially available mixtures comprising thiophosphonyl salts and sulfurized hydrocarbons sold by The Lubrizol Corporation of Cleveland, Ohio under the trade marks and trade names Anglamol 93, Anglamol 98A and Anglamol 99.

TABLE II

| Example | Base Oil) Type | Amount,%[1] | Polymer Source | Amount, %[1] | Extreme Pressure Agent Type | Amount,%[1] | Viscosity Grade |
|---|---|---|---|---|---|---|---|
| 4 | 350 Solvent Neutral | 45 | Example 1 | 12 | Anglamol 99 | 6 | 80W/90 |
|   | 650 Solvent Neutral | 37 | | | | | |
| 5 | 200 Solvent Neutral | 58 | Example 1 | 32 | Anglamol 98A | 9 | 80W/90 |
| 6 | 200 Solvent Neutral | 50 | Example 2 | 40 | Anglamol 99 | 8 | 85W/140 |

TABLE II-continued

| Example | Base Oil) Type | Amount,%[1] | Polymer Source | Amount,%[1] | Extreme Pressure Agent Type | Amount,%[1] | Viscosity Grade |
|---|---|---|---|---|---|---|---|
| 7 | 100 Solvent Neutral Synthetic Alkylated Aromatics (Mn = 340) | 30 | Example 3 | 22 | Anglamol 93 | 7 | 75W/90 |

[1] All percentages by weight.

As can be seen from an examination of the data in Table II, each of the blends of Examples 4–7 is multigraded according to SAE standards between SAE 75W and SAE 250. These blends also satisfactorily lubricate automotive differential gears and exhibit outstanding shear-resistant properties over prolonged use.

Lubricating oil concentrates can also be used conveniently to prepare such compositions, and are within the scope of the present invention. For example, a similar composition to that of Example 7 can be prepared by first forming a concentrate of polymer, extreme pressure agent and pour point depressant in the relative amounts of 62 parts, 16 parts and 1 part in 21 parts of solvent neutral diluent oil (all parts by weight). Such a concentrate is then blended with an equal part of an appropriate synthetic alkylated aromatic oil to form a composition closely resembling that of Example 7.

These concentrates comprise (B) at least one of the afore-described extreme pressure agents and (C) interpolymers, the amounts of (B) and (C) incorporated in said concentrate being such that when about 75 to about 25 parts by weight of the concentrate is blended with about 25 to 75 parts by weight of at least one natural, synthetic or synthetic-natural oil mixture having a viscosity of about 40 to about 2000 SUS at 100° F., the resulting blend is a lubricating oil composition multigraded according to SAE standards within the multigrade range of SAE 75W to SAE 250.

For example, these concentrates comprise about 15 to 70 percent of an oil (which can be natural, synthetic or a mixture of the two), about 85 to 30 percent of the afore-described polymer and about 5 to about 30 percent of the afore-described extreme pressure agents. Optionally such concentrates can also contain about 0.5 to about 5 percent of a pour point depressant.

What is claimed is:

1. A shear stable multigraded gear oil composition comprising (A) at least about 30 weight percent of a base oil having a viscosity of about 40–2000 SUS at 100° F., (B) at least one extreme pressure agent in an amount sufficient to impart extreme pressure properties thereto, and (C) at least about 5 weight percent of at least one oil-soluble interpolymer, said interpolymer being a hydrogenated interpolymer of at least one monovinyl-arene or substituted monovinyl-arene and of at least one $C_{4-6}$ conjugated diene and/or at least one $C_{3-6}$ alpha-olefin, said polymer having a number average molecular weight of about 750–10,000 and being present in an amount such as to allow the lubricating oil composition to be a multigraded gear oil having a minimum winter grade of SAE 75W and a maximum normal grade of SAE 250, said base oil being at least one natural oil, synthetic oil or mixture of same and with the proviso that when the base oil is a mixture of synthetic and natural oils, it contains about 5–95 weight percent of at least one synthetic oil.

2. A composition as claimed in claim 1 wherein the interpolymer is of at least one monovinyl-arene and at least one $C_{4-6}$ conjugated diene.

3. A composition as claimed in claim 2 wherein the interpolymer is of a monovinyl-mononuclear aromatic compound.

4. A composition as claimed in claim 3 wherein the interpolymer is of styrene or para-tertiary-butyl-styrene.

5. A composition as claimed in claim 4 wherein the polymer has a number average molecular weight of about 900–5000.

6. A composition as claimed in claim 1 wherein (A) is present in the amount of about 90–50 weight percent and has a viscosity of about 75–500 SUS at 100° F. and (B) is present in an amount of about 0.25–20%, and is selected from organo thiophosphonyl salts, sulfurized hydrocarbons and mixtures thereof and (C) is present in the amount of about 10–50 weight percent.

7. A composition as claimed in claim 6 wherein the interpolymer is a styrene-butadiene or p-tertiary-butyl-styrene-butadiene interpolymer having a number average molecular weight of about 900–5000.

8. A shear stable multigraded gear oil composition comprising (A) at least about 30 weight percent of a base oil having a viscosity of about 40–2000 SUS at 100° F., (B) at least one extreme pressure agent in an amount sufficient to impart extreme pressure properties thereto, and (C) at least about 5 weight percent of at least one oil-soluble interpolymer, said interpolymer being a hydrogenated interpolymer of at least one monovinyl-arene or substituted monovinyl-arene, at least one $C_{4-6}$ conjugated diene, and, optionally, at least one $C_{2-6}$ alpha-olefin, said polymer having a number average molecular weight of about 750–10,000 and being present in an amount such as to allow the lubricating oil composition to be a multigraded gear oil having a minimum winter grade of SAE 75W and a maximum normal grade of SAE 250, said base oil being at least one natural oil, synthetic oil or mixture of same and with the proviso that when the base oil is a mixture of synthetic and natural oils, it contains about 5–95 weight percent of at least one synthetic oil.

9. A composition as claimed in claim 8 wherein (A) is present in the amount of about 90–50 weight percent and has a viscosity of about 75–500 SUS at 100° F. and (B) is present in an amount of about 0.25–20%, and is selected from organo thiophosphonyl salts, sulfurized hydrocarbons and mixtures thereof and (C) is present in the amount of about 10–50 weight percent.

10. A composition as claimed in claim 9 wherein the interpolymer is a styrene-butadiene-ethylene interpolymer.

11. A composition as claimed in claim 1 wherein the base oil has a viscosity of about 75–500 SUS at 100° F.

12. A composition as claimed in claim 11 wherein the base oil has a viscosity of about 100–300 SUS at 100° F.

13. A composition as claimed in claim 1 wherein the amount of extreme pressure agent is from about 0.25–20 weight percent of the total composition.

14. A composition as claimed in claim 1 wherein the extreme pressure agent is selected from organo-boron-, organo-sulfur-, organo-halogen-, organo-halosulfur-, organo-phosphorus-, and organo-thiophosphorus-compounds and esters, amides and salts of phosphorus and carboxylic acids.

15. A composition as claimed in claim 14 wherein the extreme pressure agent is a mixture of organo-thiophosphonyl salts and sulfurized hydrocarbons.

16. A composition as claimed in claim 1 which also comprises about 0.01–5 weight percent of at least one pour point depressant.

17. A composition as claimed in claim 7 wherein the pour point depressant is selected from polymethacrylates, polyacrylates, condensation products of haloparaffin waxes and aromatic compounds and vinyl carboxylate polymers.

18. A composition as claimed in claim 16 wherein the pour point depressant is a terpolymer of a dialkyl fumarate, an alkyl vinyl ether, and a vinyl ester of a fatty acid.

19. A composition as claimed in claim 1 wherein the base oil consists essentially of a natural oil.

20. A composition as claimed in claim 1 wherein the base oil is a mixture of about 5–95 weight percent natural oil, and about 95–5 weight percent of at least one synthetic oil.

21. A composition as claimed in claim 1 wherein the base oil consists essentially of a synthetic oil.

22. A composition as claimed in claim 20 wherein the synthetic oil is not solely hydrocarbon in composition.

23. A composition as claimed in claim 20 wherein the synthetic oil is not derived from the same olefins as the interpolymer.

* * * * *